(12) United States Patent
Takahara

(10) Patent No.: US 11,351,940 B2
(45) Date of Patent: Jun. 7, 2022

(54) VEHICLE CONTROL DEVICE, METHOD, STORAGE MEDIUM, AND VEHICLE THAT SWITCH CONNECTIONS OF TWO BATTERIES

(71) Applicant: TOYOTA JIDOSHA KABUSHIKI KAISHA, Toyota (JP)

(72) Inventor: Yoshiyuki Takahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/080,103

(22) Filed: Oct. 26, 2020

(65) Prior Publication Data

US 2021/0237670 A1 Aug. 5, 2021

(30) Foreign Application Priority Data

Feb. 3, 2020 (JP) ............................. JP2020-016511

(51) Int. Cl.
*H02J 7/00* (2006.01)
*H02J 9/06* (2006.01)
*B60R 16/033* (2006.01)

(52) U.S. Cl.
CPC .......... *B60R 16/033* (2013.01); *H02J 7/0048* (2020.01); *H02J 7/0063* (2013.01); *H02J 9/06* (2013.01)

(58) Field of Classification Search
CPC .......... H02J 9/06; H02J 7/0063; H02J 7/0048; B60R 16/033

USPC .................................................. 307/9.1, 10.1
See application file for complete search history.

(56) References Cited

U.S. PATENT DOCUMENTS

| 11,133,702 B2* | 9/2021 | Izawa | B60L 3/04 |
| 2008/0203975 A1* | 8/2008 | Burlak | H02H 3/12 320/161 |
| 2018/0334118 A1* | 11/2018 | Masui | H02J 7/34 |
| 2019/0334375 A1 | 10/2019 | Wataru et al. | |

FOREIGN PATENT DOCUMENTS

JP 2019-193517 A 10/2019

* cited by examiner

*Primary Examiner* — Michael R. Fin
(74) *Attorney, Agent, or Firm* — Oliff PLC

(57) ABSTRACT

A vehicle control device includes a connection switching unit configured to switch the connection state to a state in which a second battery is solely connected to a first load when a voltage of a first battery is determined to be equal to or smaller than a first threshold value in a state in which the first and second batteries are connected to the first load, and after a first time has elapsed from switching to the second state, continue the state while the state of charge of the second battery is equal to or greater than a second threshold value, and switch the connection state to a state in which neither the first battery nor the second battery is connected to the first load when the state of charge of the second battery is smaller than the second threshold value.

8 Claims, 7 Drawing Sheets

VEHICLE CONTROL DEVICE, METHOD, STORAGE MEDIUM, AND VEHICLE THAT SWITCH CONNECTIONS OF TWO BATTERIES

CROSS-REFERENCE TO RELATED APPLICATION

This application claims priority to Japanese Patent Application No. 2020-016511 filed on Feb. 3, 2020, incorporated herein by reference in its entirety.

BACKGROUND

1. Technical Field

The present disclosure relates to a control device used in a vehicle equipped with a power supply system including a plurality of batteries.

2. Description of Related Art

Japanese Unexamined Patent Application Publication No. 2019-193517 (JP 2019-193517 A) discloses a power supply system redundantly including the batteries as a power supply for supplying an electric power to a load equipped in a vehicle. In the power supply system, in a case where the abnormality such as the failure of a main battery occurs, a sub-battery for backup can be connected to the load to continue supplying an electric power to the load even after the failure of the main battery occurs.

SUMMARY

In the power supply system disclosed in Japanese Unexamined Patent Application Publication No. 2019-193517 (JP 2019-193517 A), even after a predetermined fail-safe treatment performed in response to the occurrence of an abnormality of the main battery is completed by the electric power supplied from the sub-battery, the sub-battery remains connected to the load. Therefore, the electric power of the sub-battery may continue to be consumed by the load, and a state of charge of the sub-battery may decrease beyond a lower limit value of over-discharge. The sub-battery of which the state of charge decreases beyond the lower limit value may deteriorate and may not be reused.

The present disclosure has been made in view of the above problems, and is to provide a vehicle control device that suppresses the state of charge of the sub-battery to reuse the sub-battery after a predetermined fail-safe treatment performed in response to the occurrence of an abnormality of the main battery is completed by the electric power supplied from the sub-battery.

In order to solve the above-described problem, an aspect of the disclosure relates to a vehicle control device that switches a connection state between each of a first battery and a second battery, and a first load equipped in a vehicle to control an electric power to be supplied to the first load, the device including a detection unit, an estimation unit, and a connection switching unit. The detection unit is configured to detect a voltage of the first battery. The estimation unit is configured to estimate a state of charge of the second battery. The connection switching unit is configured to switch an electrical connection state between each of the first battery and the second battery, and the first load based on the voltage of the first battery and the state of charge of the second battery. In the vehicle control device according to the first aspect, the connection switching unit is configured to, in a case where the voltage of the first battery is determined to be equal to or smaller than a first threshold value in a first state in which both the first battery and the second battery are connected to the first load, switch the connection state to a second state in which the second battery is solely connected to the first load, and after a first time has elapsed from switching to the second state, continue the second state while the state of charge of the second battery is equal to or greater than a second threshold value, and when the state of charge of the second battery is smaller than the second threshold value, switch the connection state to a third state in which neither the first battery nor the second battery is connected to the first load.

In the vehicle control device according to the aspect of the present disclosure, the connection state is switched to the third state after the fail-safe treatment performed with the first load in response to the occurrence of an abnormality of the first battery (main battery) is completed (the first time has elapsed) by the electric power supplied from the second battery (the sub-battery). Therefore, a decrease in the state of charge of the second battery after the fail-safe treatment is completed can be suppressed and the second battery can be reused.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

A vehicle control device equipped with a plurality of batteries according to the present disclosure disconnects, after a fail-safe treatment performed with a specific load in response to the occurrence of an abnormality of a main battery is completed by an electric power supplied from a sub-battery, a sub-battery from the specific load based on a remaining state of charge. Therefore, a decrease in the state of charge of the sub-battery can be suppressed. Hereinafter, an embodiment of the present disclosure will be described in detail with reference to the drawings.

Configuration

Figure 1:
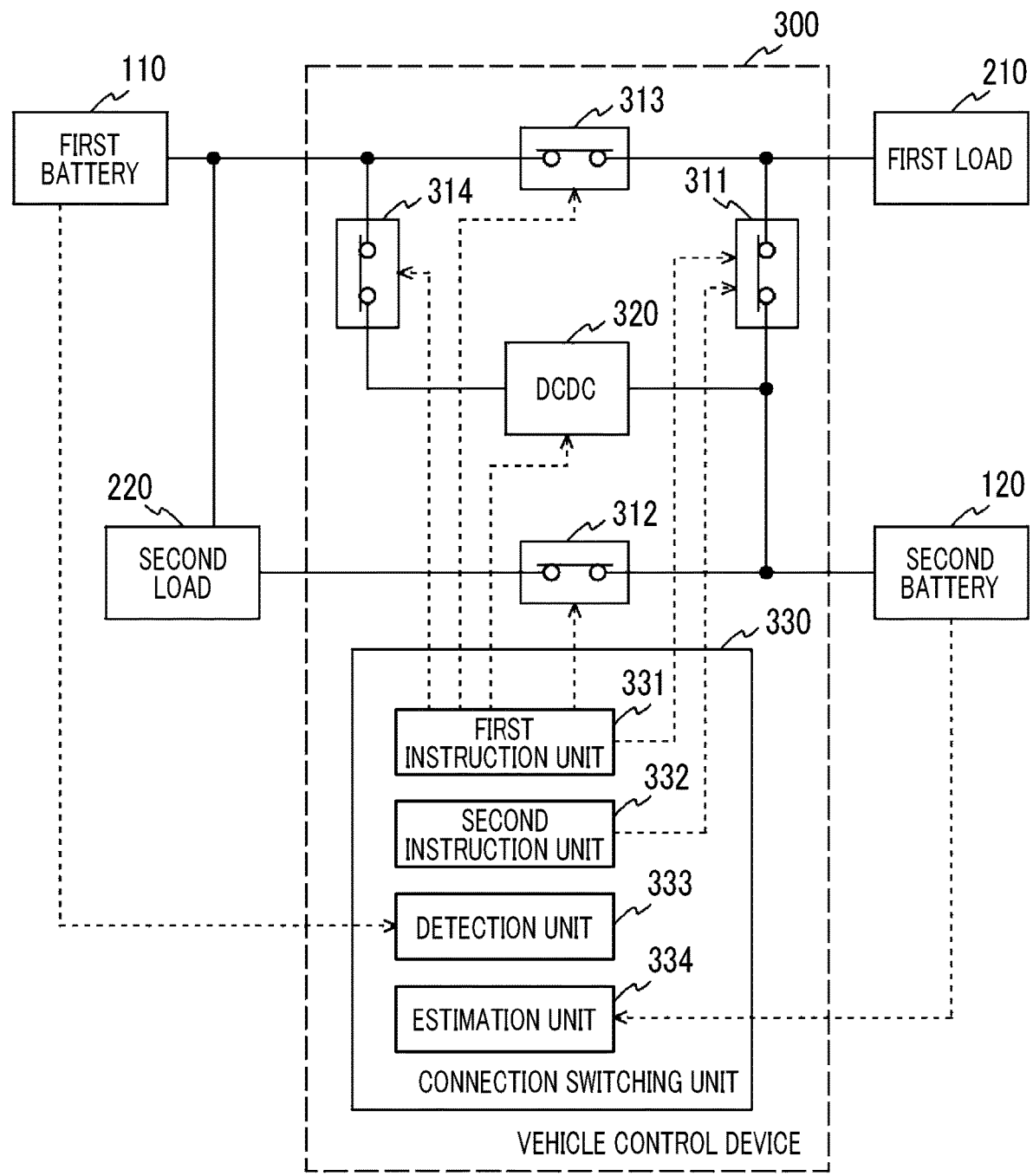
FIG. 1 is a functional block diagram of a vehicle control device and peripheral units of the device according to an embodiment.

FIG. 1 is a functional block diagram of a vehicle control device 300 and peripheral units of the device according to an embodiment of the present disclosure. The functional block shown in FIG. 1 includes a first battery 110, a second battery 120, a first load 210, a second load 220, and the vehicle control device 300. The vehicle control device 300 includes a first switch 311, a second switch 312, a third switch 313, a fourth switch 314, a DCDC converter (DCDC) 320, and a connection switching unit 330.

The vehicle control device 300 according to the embodiment can be equipped in an equipment device in which a power supply configuration including the batteries is needed. In the embodiment below, an example of a case will be described in which the vehicle control device 300 is equipped in a vehicle in which the power supply configuration redundantly including the batteries is adopted and manual driving and autonomous driving can be switched.

The first battery 110 is a chargeable and dischargeable secondary battery such as a lead storage battery. The first battery 110 supplies the electric power stored by itself to the first load 210 and the second battery 120 via the vehicle control device 300. The first battery 110 also supplies the electric power stored by itself to the second load 220. The first battery 110 can store the electric power supplied from a high-voltage battery (not shown) for vehicle traveling via the DCDC converter, or can store the electric power generated by a power generator (not shown).

The second battery 120 is a chargeable and dischargeable secondary battery such as a lithium ion battery. The second battery 120 can supply the electric power stored by itself to the first load 210 and the second load 220 via the vehicle control device 300. Also, the second battery 120 can store the electric power supplied from the first battery 110 via the vehicle control device 300.

The second battery 120 is redundantly provided as a sub-battery for backing up the first battery 110 in a case where the abnormality such as a failure of the first battery 110 due to a short circuit occurs. Accordingly, as the first battery 110 and the second battery 120, the battery having the same rated voltage is desirable.

The first load 210 is a device such as an electronic device such as an electronic control unit (ECU) equipped in the vehicle or an electrical component. The first load 210 can be a device in which a more stable electric power supply is needed than the second load 220 in autonomous driving of the vehicle. More specifically, in a case where the abnormality such as the failure of the first battery 110 occurs, the first load 210 can be a major load relating to safe traveling of the vehicle in which a predetermined fail-safe treatment is needed to be performed with the electric power supplied from the second battery 120 for backup. An example of the fail-safe treatment includes an action of controlling a speed and steering of the vehicle in autonomous driving and stopping the vehicle in a lane in which the vehicle is traveling or in a safe place near a shoulder side of a road. The first load 210 according to the embodiment can include, for example, an ECU (ADSECU) that assists autonomous driving, an ECU (brake ECU) that controls brake operation, and an ECU (EPSECU) that controls steering of the steering wheel by an electric signal.

The second load 220 is a device such as the ECU equipped in the vehicle or the electrical components. The second load 220 according to the embodiment includes a shift-by-wire (SBW) device that changes gears of the transmission with an electric signal. Examples of the shift-by-wire device include a control device (SBWECU) that converts shifting operation by the driver into the electric signal and an actuator (SBWACT) that changes a gear stage based on the electric signal instructed by the ECU.

The connection switching unit 330 described below controls connection switching such that the first load 210 and the second load 220 operate with the electric power of the first battery 110 in manual driving of the vehicle, and operate with the electric power of the second battery 120 in addition to the electric power of the first battery 110 in autonomous driving of the vehicle.

The connection switching unit 330 controls operation of the first switch 311, the second switch 312, the third switch 313, the fourth switch 314, and the DCDC converter 320 based on the voltage of the first battery 110 and the state of charge (SOC) of the second battery 120. The connection switching unit 330 is typically configured as the ECU including a processor, a memory, and an input/output interface, and the processor reads and executes the program stored in the memory to realize the functions of a first instruction unit 331, a second instruction unit 332, a detection unit 333, and an estimation unit 334 described below.

The detection unit 333 detects at least voltage as a state of the first battery 110. The detection unit 333 can include a part or all of an ECU (monitoring ECU) that monitors the voltage of the first battery 110 by using, for example, a voltage sensor. The voltage of the first battery 110 detected by the detection unit 333 is output to the first instruction unit 331 and the second instruction unit 332.

The estimation unit 334 estimates the state of charge based on various states (voltage, current, and temperature) of the second battery 120. The estimation unit 334 can include a part or all of the ECU (monitoring ECU) that monitors the voltage, the current, and the temperature of the first battery 110 by using, for example, the voltage sensor, a current sensor, and a temperature sensor. The estimation unit 334 can estimate the state of charge of the second battery 120 by following two methods.

A first method is a method of, in a case where the current flowing into the first load 210 from the second battery 120 is smaller than a predetermined low current value, regarding the voltage appearing at an output terminal of the second battery 120 as an open circuit voltage (OCV) and estimating the state of charge corresponding to the open circuit voltage from SOC-OCV characteristic curve of the second battery 120. A second method is a method of regarding the voltage appearing at the output terminal of the second battery 120 as the open circuit voltage when the voltage is stable after the ignition is turned off when the power supply system is not operating, obtaining a reference state of charge corresponding to the open circuit voltage from the SOC-OCV characteristic curve, and estimating the state of charge based on the reference state of charge, and the state of charge obtained by a well-known current integration method that integrates the current obtained by intentionally discharging or charging the second battery 120. As described above, in the second method, the state of charge can be estimated with higher precision than in the first method.

The estimation unit 334 according to the embodiment outputs the state of charge of the second battery 120 estimated by the first method to the first instruction unit 331, and outputs the state of charge of the second battery 120 estimated by the second method with high precision to the second instruction unit 332. In the example of FIG. 1, the estimation unit 334 is separately configured from the first instruction unit 331 and the second instruction unit 332, a functional unit (first estimation unit) that estimates the state of charge of the second battery 120 by the first method may be included in the first instruction unit 331, and a functional unit (second estimation unit) that estimates the state of charge of the second battery 120 by the second method may be included in the second instruction unit 332.

The first instruction unit 331 is configured by, for example, a microcomputer, and controls each opened and closed state of the first switch 311, the second switch 312, the third switch 313, and the fourth switch 314 based on the voltage of the first battery 110 detected by the detection unit 333 and the state of charge of the second battery 120 estimated by the estimation unit 334. More specifically, the first instruction unit 331 controls the opened and closed state of each switch by outputting a predetermined connecting instruction to the closed switch and by outputting no connecting instruction to the opened switch. The first instruction unit 331 controls the operation of the DCDC converter 320. The control of the DCDC converter 320 is executed by turning on and off a signal that controls the switching element configuring the converter, for example. The first instruction unit 331 can include a part or all of an ECU (power supply control ECU) that controls the power supply of the vehicle.

The second instruction unit 332 is configured by, for example, a microcomputer, and controls at least the opened and closed state of the fourth switch 314 based on the voltage of the first battery 110 detected by the detection unit 333 and the state of charge of the second battery 120 estimated by the estimation unit 334. More specifically, the second instruction unit 332 outputs the connecting instruction to the fourth switch 314 in a case of controlling the closed state of the fourth switch 314, and does not output the connecting instruction to the fourth switch 314 in a case of controlling the opened state of the fourth switch 314. The second instruction unit 332 relates the control of the fourth switch 314 and is redundantly provided with respect to the first instruction unit 331. The second instruction unit 332 can include a part or all of an ECU (battery ECU) that manages and controls the second battery 120.

With such a redundant configuration of the instruction unit, even in a case where any one of the first instruction unit 331 or the second instruction unit 332 fails or is reset, the other instruction unit that is not failed or reset can control the first switch 311 (interlock control). Therefore, in a situation in which an electric power is needed to be supplied to the first load 210 from the second battery 120, the electric power can be supplied to the first load 210 by connecting the second battery 120.

The first switch 311 is disposed between a connection point in which a secondary side of the DCDC converter 320 and the second battery 120 are connected and the first load 210, and is configured so as to be openable and closable based on the instruction from the connection switching unit 330. The first switch 311 is controlled to be opened when the vehicle travels in manual driving, and is controlled to be closed when the vehicle travels in autonomous driving in principle.

The second switch 312 is disposed between a connection point in which a secondary side of the DCDC converter 320 and the second battery 120 are connected and the second load 220, and is configured so as to be openable and closable based on the instruction from the connection switching unit 330. The second switch 312 is controlled to be opened when the vehicle travels in manual driving in principle, and is controlled to be closed when the vehicle travels in autonomous driving.

The third switch 313 is disposed between the first battery 110 and the first load 210, and is configured so as to be openable and closable based on the instruction from the connection switching unit 330. The third switch 313 is controlled to be closed when the vehicle travels in manual driving, and is controlled to be opened when the vehicle travels in autonomous driving.

The fourth switch 314 is disposed between the first battery 110 and a primary side of the DCDC converter 320, and is configured so as to be openable and closable based on the instruction from the connection switching unit 330. The fourth switch 314 is controlled to be opened when the vehicle travels in manual driving, and is controlled to be closed when the vehicle travels in autonomous driving in principle.

As the first switch 311, the second switch 312, the third switch 313, and the fourth switch 314, a semiconductor relay, an excitation type mechanical relay, or the like can be used. The form of the connecting instruction output from the first instruction unit 331 and the second instruction unit 332 to each switch is determined depending on the relay component used as the switch. For example, when a normally-off switch is used, the connecting instruction may be output from at least one of the first instruction unit 331 or the second instruction unit 332 solely in a case where the switch is closed.

The DCDC converter (DCDC) 320 is a voltage converter that converts the input voltage into a predetermined voltage, and outputs the converted voltage. The DCDC converter 320 has a primary side connected to the first battery 110 via the fourth switch 314, and a secondary side connected to the second battery 120. The DCDC converter 320 is typically configured by the unidirectional DCDC converter having a function of transforming (stepping up or down) the voltage of the first battery 110 that is an input voltage on the primary side into an output voltage on the secondary side. Further, the DCDC converter 320 may be the bidirectional DCDC converter having a function of transforming (stepping up or down) the voltage of the second battery 120 that is an input voltage on the secondary side into an output voltage on the primary side.

Figure 2:
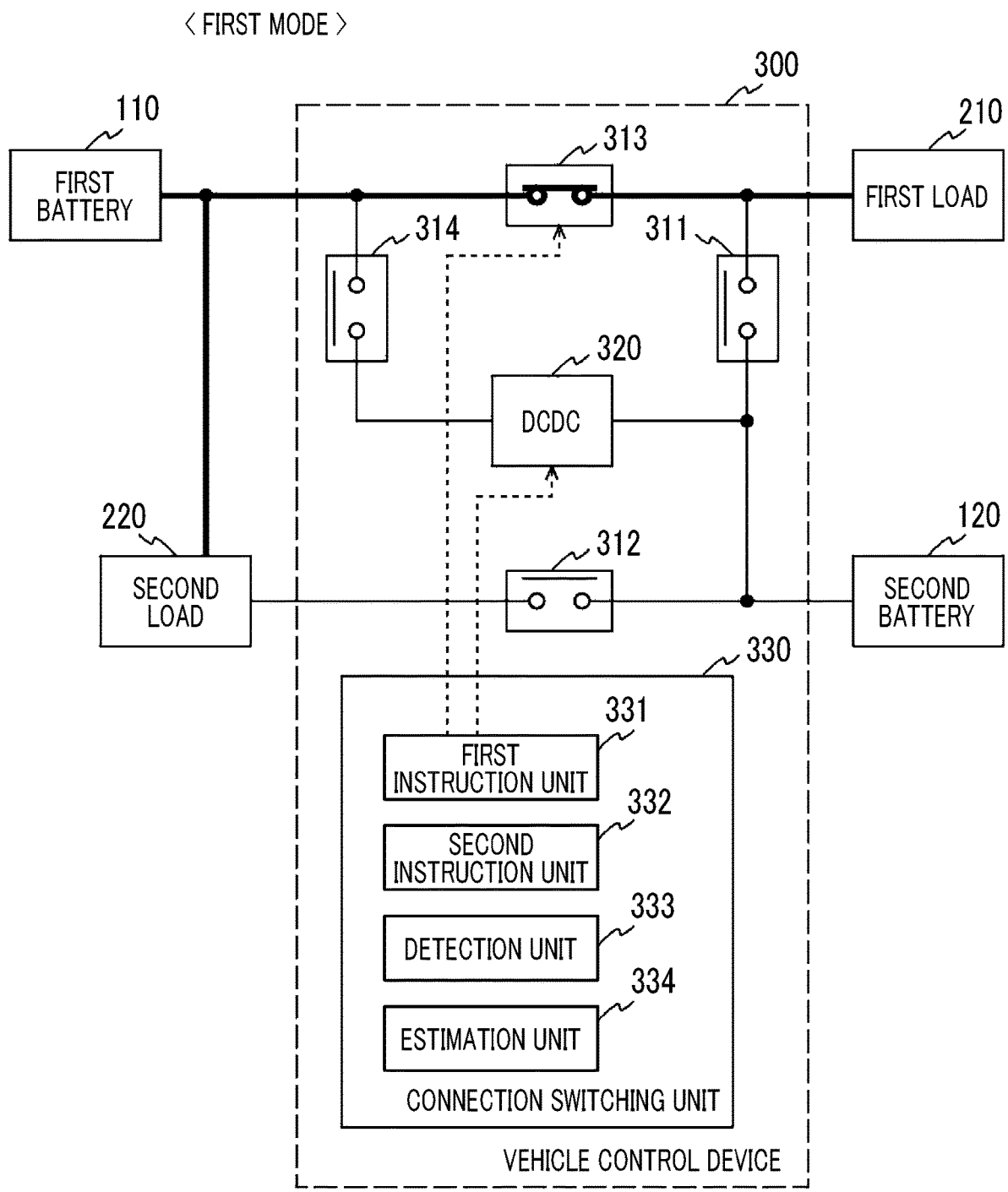
FIG. 2 is a diagram showing a control mode of each configuration in a first mode.
Figure 3:
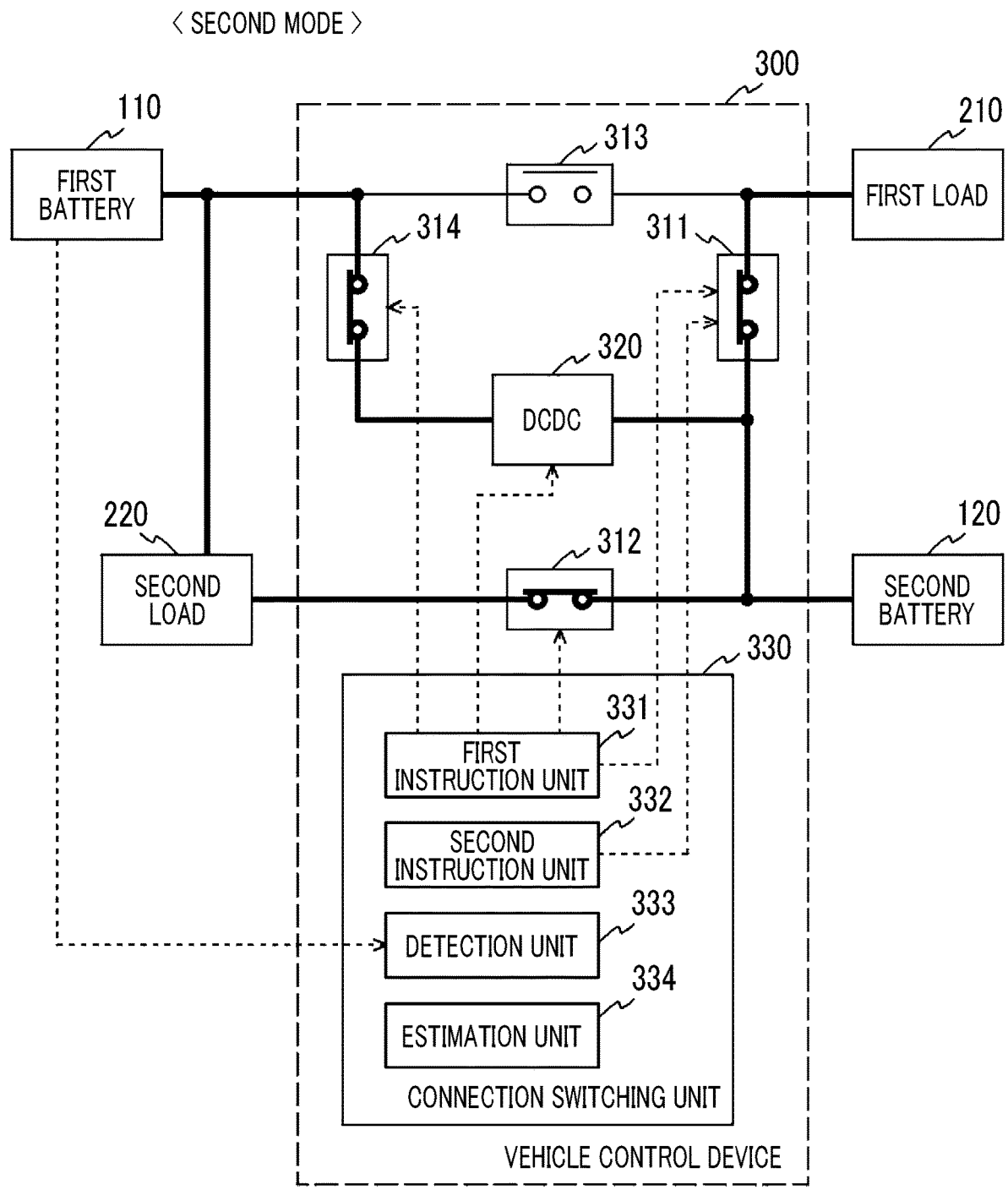
FIG. 3 is a diagram showing a control mode of each configuration in a second mode.
Figure 4:
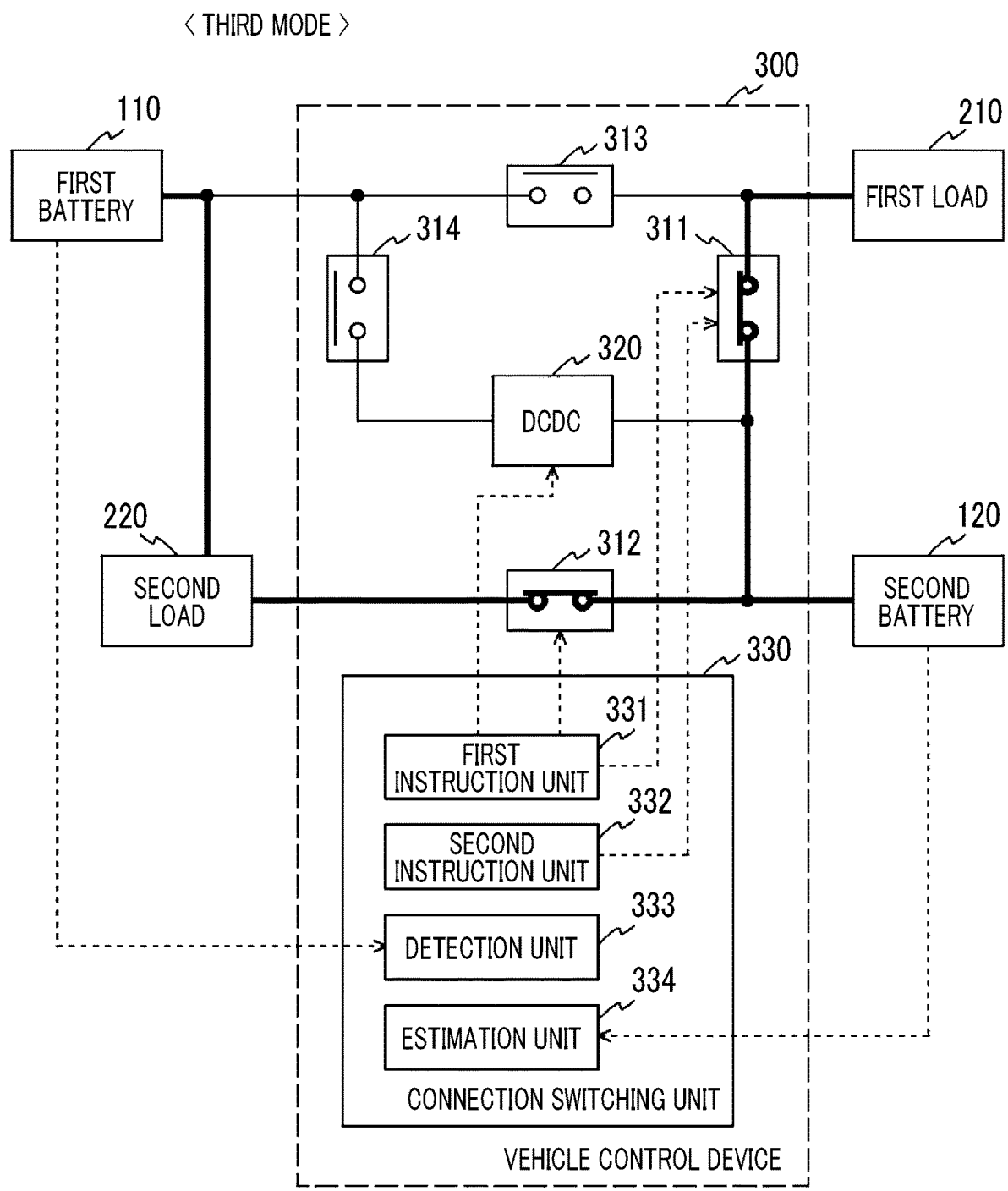
FIG. 4 is a diagram showing a control mode of each configuration in a third mode.
Figure 5:
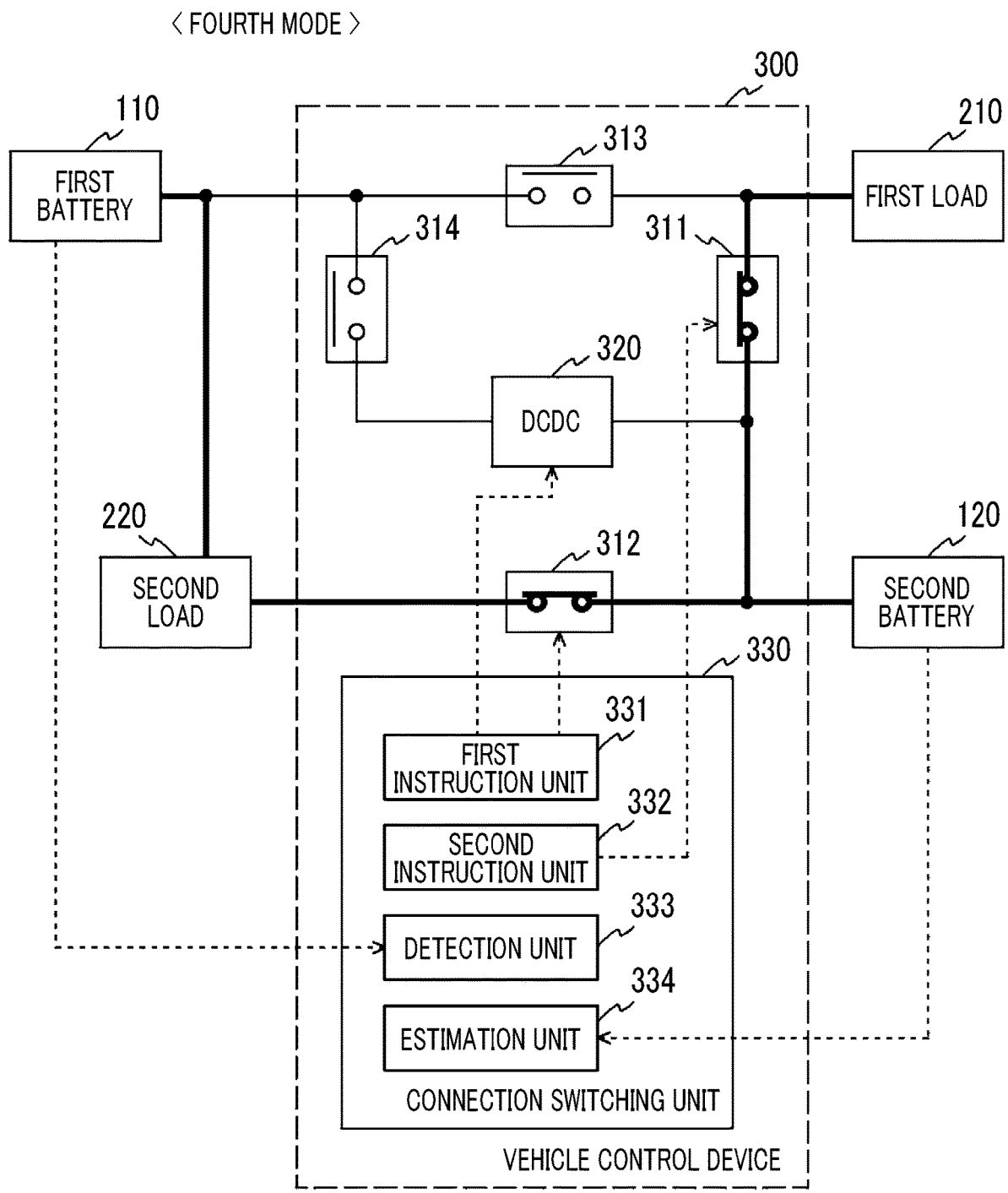
FIG. 5 is a diagram showing a control mode of each configuration in a fourth mode.
Figure 6:
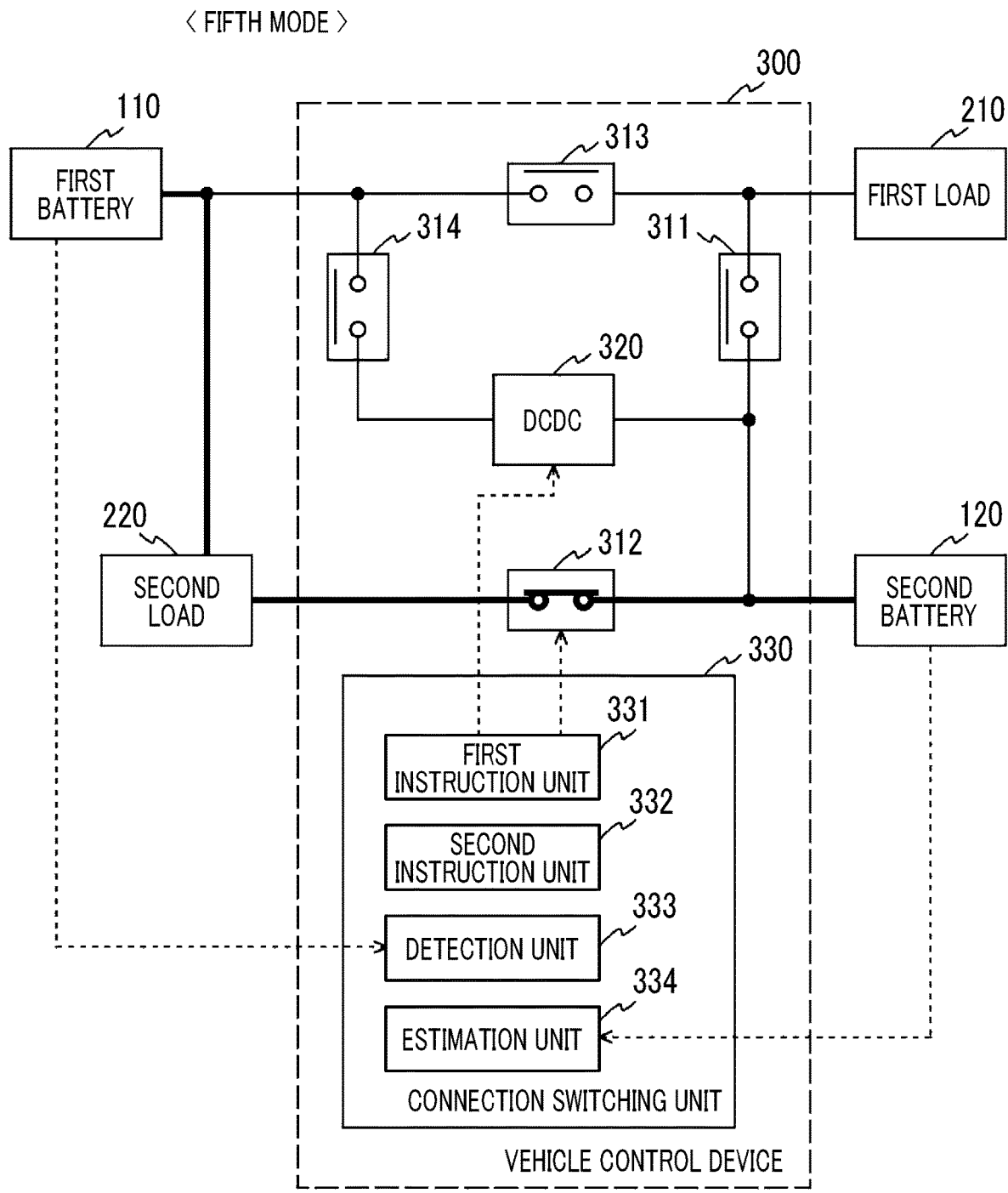
FIG. 6 is a diagram showing a control mode of each configuration in a fifth mode.

The vehicle control device 300 according to the embodiment executes the control by setting configurations of the first switch 311, the second switch 312, the fourth switch 314, and the DCDC converter 320 to any control mode of a first mode, a second mode, a third mode, a fourth mode, or a fifth mode based on the voltage of the first battery 110 and the state of charge (SOC) of the second battery 120. FIG. 2 shows a control mode of the configurations in the first mode, FIG. 3 shows a control mode of the configurations in the second mode, FIG. 4 shows a control mode of the configurations in the third mode, FIG. 5 shows a control mode of the configurations in the fourth mode, and FIG. 6 shows a control mode of the configurations in the fifth mode.

The first mode (FIG. 2) is a mode selected when the vehicle can travel in manual driving by the driver. When the first mode is set, the connecting instruction is output to the third switch 313, the third switch 313 is closed, the first switch 311, the second switch 312, the fourth switch 314 are opened without the connecting instruction, and the connection state becomes the state in which the first battery 110 is solely connected to the first load 210. The first battery 110 is connected to the second load 220. The DCDC converter 320 stops operating in principle.

The second mode (FIG. 3) is a mode selected when the vehicle can travel in autonomous driving based on the autonomous driving ECU. When the second mode is set, the connecting instruction is respectively output to the first switch 311, the second switch 312, and the fourth switch 314, the first switch 311, the second switch 312, and the fourth switch 314 are closed, the third switch 313 is opened without the connecting instruction, the DCDC converter 320 operates, and the connecting instruction becomes the state in which both the first battery 110 and the second battery 120 are connected to the first load 210. The connection state of each configuration based on the setting in the second mode is a first state. For closing the first switch 311, the interlock control by both the connecting instruction from the first instruction unit 331 and the connecting instruction from the second instruction unit 332 is used. Both the first battery 110 and the second battery 120 are connected to the second load 220. In the second mode, the vehicle control device 300 is in a standby state such that the second battery 120 can back up the first battery 110.

The third mode (FIG. 4) is a mode selected when the fail-safe treatment is needed to be performed during traveling of the vehicle in autonomous driving. When the third mode is set, the connecting instruction is output to the first switch 311 and the second switch 312, the first switch 311 and the second switch 312 are closed, the third switch 313 and the fourth switch 314 are opened without the connecting instruction, and the connection state becomes the state in which the second battery 120 is solely connected to the first load 210. The connection state of each configuration based on the setting in the third mode is a second state. For closing the first switch 311, similar to the second mode, the interlock control by both the connecting instruction from the first instruction unit 331 and the connecting instruction from the second instruction unit 332 is used. At least the second battery 120 is connected to the second load 220. The DCDC converter 320 stops operating in principle. In the third mode, the vehicle control device 300 is in a state in which the second battery 120 backs up the first battery 110 and the operation of the first load 210 is ensured.

The fourth mode (FIG. 5) is a mode selected according to the state of charge of the second battery 120 after the fail-safe treatment is completed in the vehicle traveling in autonomous driving. The connection states of the configurations set in the fourth mode is the same as the second state that is the connection states of the configurations in the third mode, but the closing of the first switch 311 is performed solely by the connecting instruction from the second instruction unit 332 (non-interlock control). Similar to in the third mode, in the fourth mode, the second battery 120 is in a state of backing up the first battery 110, but after the fail-safe treatment is completed, the second instruction unit 332 having higher detection precision monitors the state of the second battery 120 solely, and the processing load and the power consumption of the first instruction unit 331 are intended to be reduced.

The fifth mode (FIG. 6) is a mode selected according to the state of charge of the second battery 120 after the fail-safe treatment is completed in the vehicle traveling in autonomous driving. When the fifth mode is set, the connecting instruction is output to the second switch 312, the second switch 312 is closed, the first switch 311, the third switch 313, the fourth switch 314 are opened without the connecting instruction, and the connection state becomes the state in which neither the first battery 110 nor the second battery 120 is connected to the first load 210. The connection state of each configuration based on the setting in the fifth mode is a third state. At least the second battery 120 is connected to the second load 220. The DCDC converter 320 stops operating in principle. In the fifth mode, the vehicle control device 300 is in a state in which the second battery 120 ensures the operation of the second load 220 as the backup of the first battery 110.

In the vehicle control device 300 shown in FIG. 1, an example in which the first switch 311, the second switch 312, the third switch 313, and the fourth switch 314 are provided is illustrated, but other switches may be further provided. For example, a switch being closed in the first mode, the second mode, the third mode, and the fourth mode, and being opened in the fifth mode may be provided between the connection point in which the first switch 311 and the third switch 313 are connected and the first load 210. With the switch, even when the third switch 313 fails, the first load 210 can be reliably disconnected from the first battery 110 in which the abnormality occurs. Further, between a negative terminal of the second battery 120 and the ground (body earth), a switch being closed while the power supply system of the vehicle is turned on (READY-ON, ACC-ON, IG-ON), and being opened while the power supply system of the vehicle is turned off may be provided. With the switch, the second battery 120 can be prevented from being unnecessarily discharged when the power supply system of the vehicle is turned off. Further, in the example of FIG. 1, one second switch 312 is provided for the second load 220 that is the shift-by-wire device, but the switch may be provided for each of the control device (SBWECU) and the actuator (SBWACT) that configure the shift-by-wire device. With the switch, the electric power can be supplied from the second battery 120 with respect to each of the control device and the actuator.

Control

Figure 7:
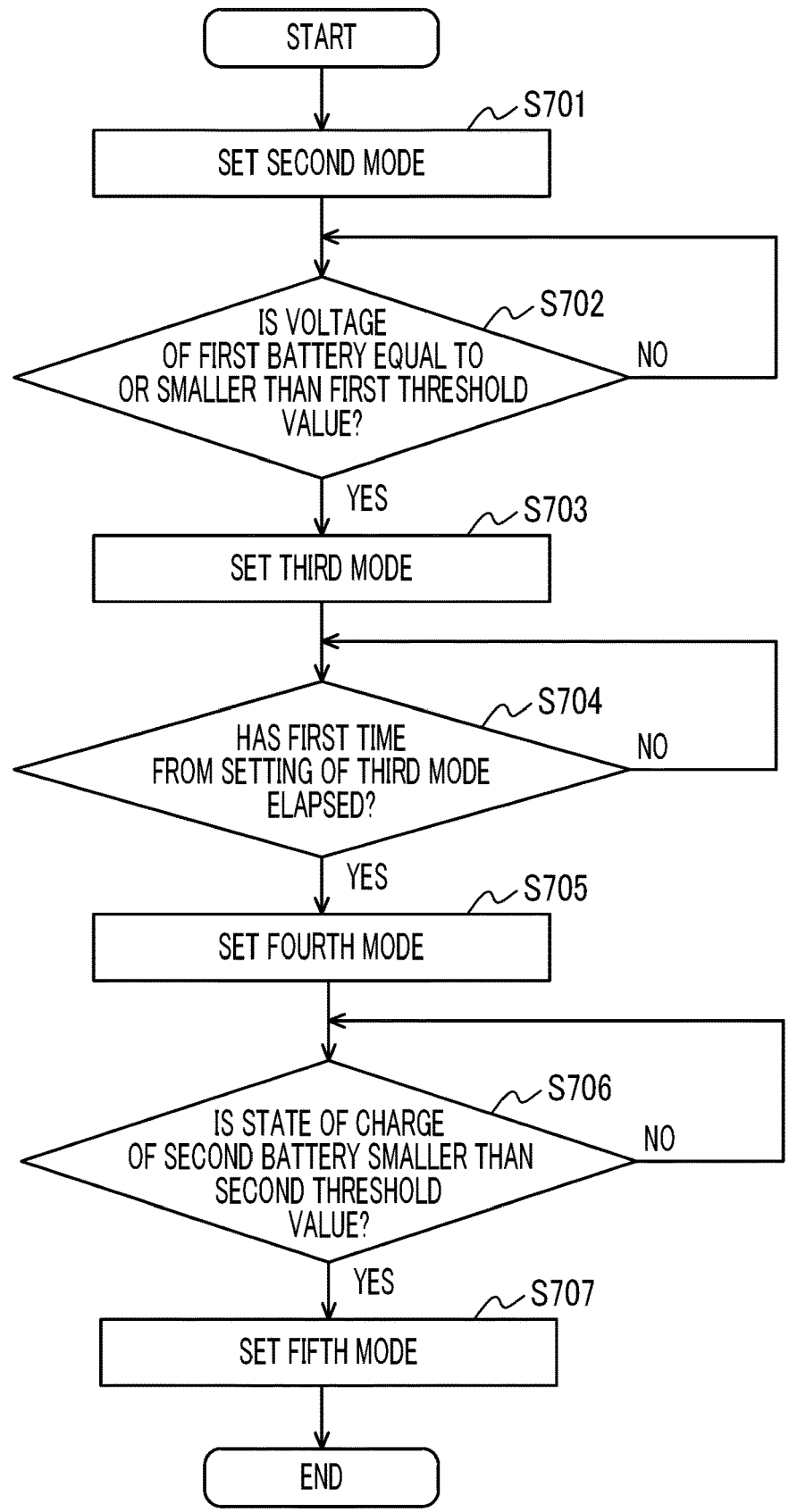
FIG. 7 is a processing flowchart of battery connection control executed by a connection switching unit in autonomous driving.

Next, the control executed by the vehicle control device 300 according to the embodiment will be described with further reference to FIG. 7. FIG. 7 is a flowchart describing a processing procedure of a battery connection control executed by the connection switching unit 330 of the vehicle control device 300 during autonomous driving.

The battery connection control shown in FIG. 7 starts when the vehicle traveling in manual driving is switched to the vehicle traveling in autonomous driving. The connection states of the switches before the start of the control are set to the first mode. The battery connection control ends when the vehicle traveling in autonomous driving is switched to the vehicle traveling in manual driving, or the power supply of the vehicle is turned off.

Step S701: The connection switching unit 330 sets the control mode of the vehicle control device 300 to the second mode in which the first switch 311, the second switch 312, and the fourth switch 314 are closed and the third switch 313 is opened. Accordingly, the connection state of the vehicle control device 300 becomes the first state in which both the first battery 110 and the second battery 120 are connected to the first load 210. When the second mode is set, the processing proceeds to step S702.

Step S702: The connection switching unit 330 determines whether the voltage of the first battery 110 is equal to or smaller than a first threshold value. The determination is made to determine whether the abnormality such as a failure of the first battery 110 occurs. Accordingly, the first threshold value is set based on the voltage of the first battery 110 that decreases due to the short circuit. In a case where the voltage of the first battery 110 is equal to or smaller than the first threshold value (YES in S702), the processing proceeds to step S703. On the other hand, in a case where the voltage of the first battery 110 exceeds the first threshold value (NO in S702), the determination of step S702 is continuously made.

Step S703: The connection switching unit 330 sets the control mode of the vehicle control device 300 to the third mode in which the first switch 311 and the second switch 312 are closed and the third switch 313 and the fourth switch 314 are opened. Accordingly, the connection state of the vehicle control device 300 becomes the second state in which the second battery 120 is solely connected to the first load 210. In the third mode, the first switch 311 is opened by the connecting instruction from both the first instruction unit 331 and the second instruction unit 332 (interlock control). When the third mode is set, the processing proceeds to step S704.

Step S704: The connection switching unit 330 determines whether the first time has elapsed after the control mode of the vehicle control device 300 is set to the third mode. Stated another way, the connection switching unit 330 determines whether the first time has elapsed after the connection state of the vehicle control device 300 is switched to the second state. The determination is made to determine whether a predetermined fail-safe treatment to be performed when the abnormality of the first battery 110 occurs is reliably completed. Therefore, the first time is set to be equal to or greater than a predetermined time needed until the fail-safe treatment by the first load 210 with the electric power supplied from the second battery 120 is completed. In a case where the first time has elapsed after the control mode is set to the third mode (YES in S704), the processing proceeds to step S705. On the other hand, in a case where the first time has not elapsed after the control mode is set to the third mode (NO in S704), the determination of step S704 is continuously made.

Step S705: The connection switching unit 330 sets the control mode of the vehicle control device 300 to the fourth mode in which the first switch 311 and the second switch 312 are closed and the third switch 313 and the fourth switch 314 are opened. In this case, the connection state of the vehicle control device 300 is continued in the second state in which the second battery 120 is solely connected to the first load 210, but in the fourth mode, the first switch 311 is opened by the connecting instruction by solely the second instruction unit 332 (non-interlock control). When the fourth mode is set, the processing proceeds to step S706.

Step S706: The connection switching unit 330 determines whether the state of charge (SOC) of the second battery 120 is smaller than a second threshold value. The determination is made to determine whether the gear of the transmission that is the second load 220 can be fixed in the parking range even after the fail-safe treatment is completed. Therefore, the second threshold value is set based on the electric power needed for fixing the gear of the transmission in the parking range. In a case where the state of charge of the second battery 120 is smaller than the second threshold value (YES in S706), the processing proceeds to step S707. On the other hand, in a case where the state of charge of the second battery 120 is equal to or greater than the second threshold value (NO in S706), the determination of step S706 is continuously made.

Step S707: The connection switching unit 330 sets the control mode of the vehicle control device 300 to the fifth mode in which the second switch 312 is closed and the first switch 311, the third switch 313, and the fourth switch 314 are opened. Accordingly, the connection state of the vehicle control device 300 becomes the third state in which neither the first battery 110 nor the second battery 120 is connected to the first load 210. When the fifth mode is set, the battery connection control ends.

Operations and Effects

In the vehicle control device 300 according to the embodiment, in a case of autonomous driving in which both the first battery 110 and the second battery 120 are connected to the first load 210 (second mode, first state), when the abnormality of the first battery 110 occurs, the connection state is switched to a state in which the first battery 110 is disconnected and the solely the second battery 120 is connected to the first load 210 (third mode, second state). Due to the control, the electric power needed for performing the fail-safe treatment by the first load 210 can be ensured.

After the time (first time) needed for the fail-safe treatment has elapsed from switching the connection state to the state in which the first battery 110 is disconnected and the second battery 120 is solely connected to the first load 210 (third mode, second state), the state is continued in which the second battery 120 is solely connected to the first load 210 (fourth mode, second state) while the state of charge (SOC) of the second battery 120 is equal to or greater than the state of charge (second threshold value) in which the electric power needed for the operation of the second load 220 can be ensured, and further operation in the first load 210 (for example, assistance of steering of the steering wheel) is allowed. Additionally, when the state of charge of the second battery 120 is smaller than the second threshold value, the connection state is switched to a state in which the second battery 120 is also disconnected from the first load 210 (fifth mode, third state). Due to the control, the state of charge of the second battery 120 can be suppressed from being reduced to an over-discharged level, and the second battery 120 after the fail-safe treatment is completed can be reused.

The vehicle control device 300 according to the embodiment controls the first switch 311 that switches connection and disconnection between the second battery 120 and the first load 210 by the interlock control with the first instruction unit 331 and the second instruction unit 332 that are redundantly configured. Due to the control, even in a case where any one instruction unit fails or is reset when the fail-safe treatment is performed (third mode, second state), the electric power of the second battery 120 can be continuously supplied to the first load 210, and the fail-safe treatment can be continued until completion to ensure the safety. Since the estimation precision of the state of charge of the second battery 120 acquired by the first instruction unit 331 and the estimation precision of the state of charge of the second battery 120 acquired by the second instruction unit 332 are different, the interlock control of the first switch 311 can be effectively executed. Also, after the fail-safe treatment is completed, the interlock control by the first instruction unit 331 and the second instruction unit 332 is released (fourth mode, second state), the power consumption in the instruction unit can be suppressed.

In the vehicle control device 300 according to the embodiment, when the second load 220 is the shift-by-wire device, the state of charge (second threshold value) of the second battery 120 that switches the state in which the second battery 120 is solely connected to the first load 210 (fourth mode, second state) to the state in which the second battery 120 is disconnected (the fifth mode, the third state) is set to the state of charge in which the electric power needed for fixing the gear of the transmission in the parking range can be supplied. Therefore, after the fail-safe treatment is completed, the electric power for operating the shift-by-wire device can be ensured, so the vehicle can be reliably stopped in a safe state.

As described above, the embodiment of the technology of the present disclosure is described. However, the present disclosure is regarded as a vehicle control device, a method of a battery connection control executed by the vehicle control device including a processor and a memory, a control program for executing the method of the battery connection control, a computer readable non-transitory storage medium that stores the control program, and a vehicle equipped with a power supply system including the vehicle control device.

The vehicle control device according to the present disclosure can be used in a vehicle equipped with a power supply system including the batteries.

What is claimed is:

1. A vehicle control device that switches a connection state between each of a first battery and a second battery, and a first load equipped in a vehicle to control an electric power to be supplied to the first load, the device comprising:
   a first switch configured to connect the first load to the second battery based on a connecting instruction, and when the connecting instruction is not received, disconnect the first load from the second battery; and
   a processor configured to:
      detect a voltage of the first battery;
      estimate a state of charge of the second battery;
      output a first connecting instruction and output a second connecting instruction to the first switch, in a first connection state in which both the first battery and the second battery are connected to the first load;
      output the second connecting instruction and not output the first connecting instruction to the first switch, in a second connection state in which the second battery is solely connected to the first load;
      not output the first connecting instruction and not output the second connecting instruction to the first switch, in a third connection state in which neither the first battery nor the second battery is connected to the first load;
      in a case where the voltage of the first battery is determined to be equal to or smaller than a first threshold value in the first connection state, switch to the second connection state; and
      after a first time has elapsed from switching to the second connection state, continue the second connection state while the state of charge of the second battery is equal to or greater than a second threshold value, and when the state of charge of the second battery is smaller than the second threshold value, switch to the third connection state.

2. The vehicle control device according to claim 1, wherein the processor is configured to:
   output the first connecting instruction based on the state of charge of the second battery estimated by a first method; and
   output the second connecting instruction based on the state of charge of the second battery estimated by a second method having higher estimation precision than the first method.

3. The vehicle control device according to claim 1, further comprising:
   a second switch configured to connect a second load relating to a control of a transmission equipped in the vehicle to the second battery based on the connecting instruction, and when the connecting instruction is not performed, disconnect the second load from the second battery,
   wherein the processor is configured to, in at least the second connection state and the third connection state, output the first connecting instruction to the second switch.

4. The vehicle control device according to claim 3, wherein the second threshold value is equal to or greater than a state of charge in which an electric power needed for a control of fixing a gear of the transmission in a parking range is able to be supplied to the second load.

5. The vehicle control device according to claim 1, wherein the vehicle is able to travel in autonomous driving in the first connection state, the second connection state, and the third connection state.

6. A control method executed by a computer of a vehicle control device that switches a connection state between each of a first battery and a second battery, and a first load equipped in a vehicle to control an electric power to be supplied to the first load, the vehicle being equipped with a first switch configured to connect the first load to the second battery based on a connecting instruction, and when the connecting instruction is not received, disconnect the first load from the second battery, the method comprising:
   detecting a voltage of the first battery;
   estimating a state of charge of the second battery;
   outputting a first connecting instruction and outputting a second connecting instruction to the first switch, in a first connection state in which both the first battery and the second battery are connected to the first load;
   outputting the second connecting instruction and not outputting the first connecting instruction to the first switch, in a second connection state in which the second battery is solely connected to the first load;
   not outputting the first connecting instruction and not outputting the second connecting instruction to the first switch, in a third connection state in which neither the first battery nor the second battery is connected to the first load;
   determining whether the voltage of the first battery is equal to or smaller than a first threshold value in the first connection state;
   in a case where the voltage of the first battery is determined to be equal to or smaller than the first threshold value, switching to the second connection state; and
   in a case where the voltage of the first battery is determined to be equal to or smaller than the first threshold value, after a first time has elapsed from switching to the second connection state, continuing the second connection state while the state of charge of the second battery is equal to or greater than a second threshold value, and when the state of charge of the second battery is smaller than the second threshold value, switching to the third connection state.

7. A non-transitory storage medium containing a control program causing a computer of a vehicle control device that switches a connection state between each of a first battery and a second battery, and a first load equipped in a vehicle to control an electric power to be supplied to the first load, the vehicle being equipped with a first switch configured to connect the first load to the second battery based on a connecting instruction, and when the connecting instruction is not received, disconnect the first load from the second battery, to execute:
   detecting a voltage of the first battery;
   estimating a state of charge of the second battery;
   outputting a first connecting instruction and outputting a second connecting instruction to the first switch, in a first connection state in which both the first battery and the second battery are connected to the first load;
   outputting the second connecting instruction and not outputting the first connecting instruction to the first switch, in a second connection state in which the second battery is solely connected to the first load;
   not outputting the first connecting instruction and not outputting the second connecting instruction to the first switch, in a third connection state in which neither the first battery nor the second battery is connected to the first load;

determining whether the voltage of the first battery is equal to or smaller than a first threshold value in a the first connection state;

in a case where the voltage of the first battery is determined to be equal to or smaller than the first threshold value, switching to the second connection state; and in a case where the voltage of the first battery is determined to be equal to or smaller than the first threshold value, after a first time has elapsed from switching to the second connection state, continuing the second connection state while the state of charge of the second battery is equal to or greater than a second threshold value, and when the state of charge of the second battery is smaller than the second threshold value, switching to the third connection state.

8. A vehicle equipped with the vehicle control device according to claim 1.

* * * * *